United States Patent
Rachwalski et al.

(10) Patent No.: US 7,321,319 B2
(45) Date of Patent: Jan. 22, 2008

(54) SYSTEM AND METHOD FOR IDENTIFYING AND PROCESSING DATA WITHIN A DATA STREAM

(75) Inventors: Jon Rachwalski, Holbrook, NY (US); Daniel Witt, Center Moriches, NY (US)

(73) Assignee: Vectormax Corporation, Farmingdale, NY (US)

( * ) Notice: Subject to any disclaimer, the term of this patent is extended or adjusted under 35 U.S.C. 154(b) by 0 days.

(21) Appl. No.: 11/245,460

(22) Filed: Oct. 5, 2005

(65) Prior Publication Data

US 2006/0087457 A1    Apr. 27, 2006

Related U.S. Application Data

(60) Provisional application No. 60/615,989, filed on Oct. 5, 2004.

(51) Int. Cl.
*H03M 7/34* (2006.01)

(52) U.S. Cl. .......................................... 341/51; 341/50

(58) Field of Classification Search ............ 341/50–90; 375/240; 348/390, 423
See application file for complete search history.

(56) References Cited

U.S. PATENT DOCUMENTS 5,751,356 A * 5/1998 Suzuki ................. 375/240.01
6,829,299 B1 * 12/2004 Chujoh et al. ............... 375/240
6,954,156 B2 * 10/2005 Kadono et al. ................ 341/67
2002/0034144 A1 * 3/2002 Kotani ..................... 369/59.25
2002/0166122 A1 * 11/2002 Kikinis et al. ................. 725/56
2004/0186841 A1    9/2004 Heuer et al.

FOREIGN PATENT DOCUMENTS

EP    1039750 A2    9/2000

OTHER PUBLICATIONS

Panis G. et al.; "Bitstream syntax description: a tool for multimedia resource adaption within MPEG-21", Signal Processing Image Communication; Elsevier Science Publishers, Amsterdam, NL; vol. 18, No. 8; Sep. 2003; pp. 721-47.
Hong et al.; "XFlavor: Providing XML features in Media Representation", Department of Electrical Engineering, Columbia University, New York City, NY, USA; Apr. 22, 2004, pp. 1-20.
Hendrickx; "Technologies for Multichannel Publication", IMEC, Sep. 7, 2004; pp. 1-139.

* cited by examiner

*Primary Examiner*—Lam T. Mai
(74) *Attorney, Agent, or Firm*—David N. Caracappa

(57) ABSTRACT

A system involves encoding a video data stream. The system includes a first determinator for determining attributes associated with the video data stream and an encoder for receiving the attributes from the first determinator and encoding a stream header identifying stream syntax. The stream header is encoded in a markup language. A multiplexer combines the encoded stream headers with the video data stream.

12 Claims, 6 Drawing Sheets

SYSTEM AND METHOD FOR IDENTIFYING AND PROCESSING DATA WITHIN A DATA STREAM

CROSS-REFERENCE TO RELATED APPLICATIONS

This is a non-provisional application of U.S. Provisional Application Ser. No. 60/615,989 filed Oct. 5, 2004.

FIELD OF THE INVENTION

The present system relates to encoding video data and, more particularly, providing a mechanism for identifying and processing data within a data stream.

BACKGROUND OF THE INVENTION

A multimedia data stream is a stream of encoded video data able to be transmitted for receipt by a player application, typically a media player application. Prior to transmission of the multimedia data stream, the data stream is partitioned into a plurality of packets containing data representing a portion of a frame of the encoded video data. Both the stream itself and each respective packet of the stream includes a header that provides information representing stream syntax to the receiving system about the stream and/or packet being received. Existing systems encode this information in at least one of a text and binary format. However, these formats are problematic in that they are not easily upgradeable and require the player to be hard coded with a set of instructions able to decode the stream in the encoded format. Thus, the stream flexibility is reduced because stream proxies used to decode the data stream must be updated to handle any altered stream syntax or else are subject to failure.

Markup Languages are widely used languages that provide a way of depicting the logical structure or semantics associated with an element of data and provide instructions to a system on how to at least one of handle, process and display the received data stream. Examples of markup languages are Hypertext markup language (HTML), eXtensible Markup Language (XML) and Standard General Markup Language (SGML). Markup languages provide a mechanism for annotating data or a collection of digital data in order to indicate the structure of the document or datafile and the contents of its data elements. These languages are readily expandable. However, they are -generally associated with a stream of data and not formed integral therewith.

A system according to invention principles address these deficiencies and associated problems.

SUMMARY OF THE INVENTION

The present invention relates to a system and method for encoding a video data stream. A determinator determines attributes associated with the video data stream. An encoder receives the attributes from the first determinator and encodes a stream header identifying stream syntax, the stream header being encoded in a markup language. A multiplexer combines the encoded stream headers with the video data stream.

The present invention further relates to a system for decoding an encoded video data stream. A parser analyzes the received data stream and stream headers to determine the existence of markup tags identifying attributes of the received data stream and frames of the data stream. A decoder decodes the received data streams and markup tags. A display generator generates a display of the decoded video data stream in response to identified attributes of the received data stream.

BRIEF DESCRIPTION OF THE DRAWING FIGURES

DETAILED DESCRIPTION OF THE INVENTION

Figure 1:
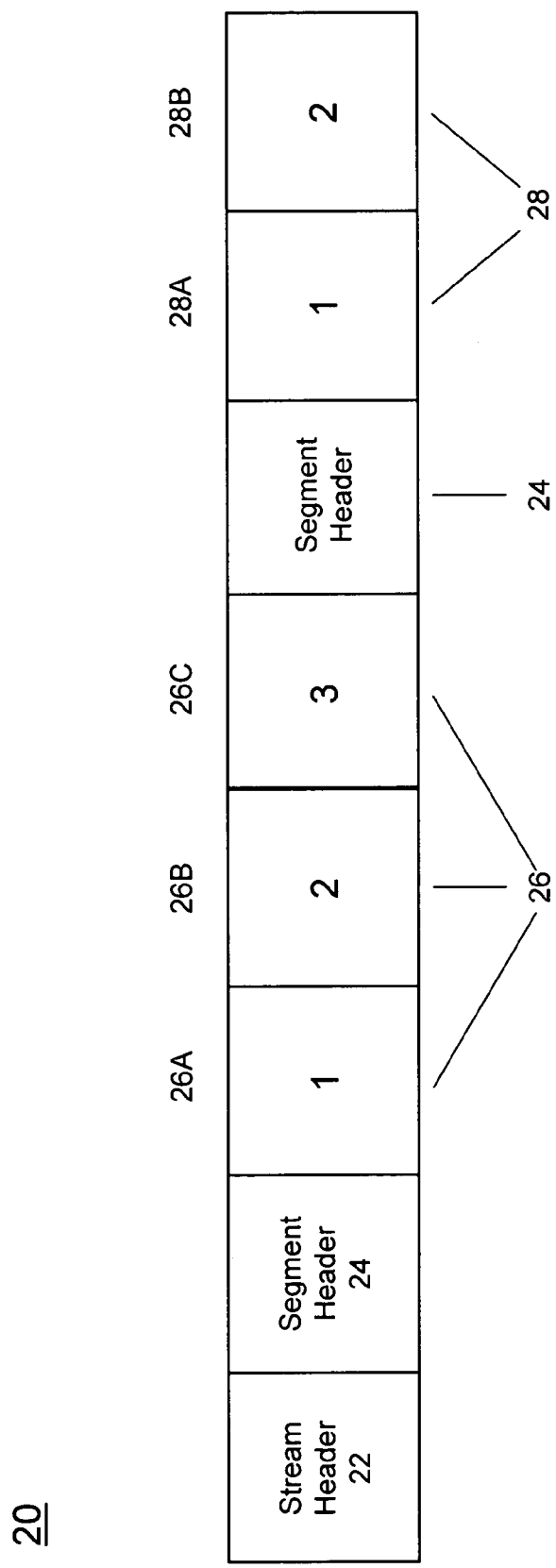
FIG. 1 is data stream including a plurality of types of headers according to invention principles.

An application as used herein is an executable computer program or set of instructions comprising code or machine readable instruction for implementing predetermined functions including those of an operating system, healthcare information system or other information processing system, for example, in response to user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. Multimedia content or content stream as used herein is any encoded or un-encoded data having at least one of video data and audio data. A frame as used herein represents an atomic unit of application data and a frame group refers to a group of frames.

Multimedia data steams may be encoded and compressed using a plurality of different types of encoding schemes. The choice of encoding schemes vary depending upon the application that will be receiving and processing the video data. The system includes a multimedia data stream that is encoded using a proprietary encoding format whereby the video data stream is partitioned into respective groups of frames wherein each respective group of frames is formed from a plurality of individual video frames. The structure of the groups of frames and the frames that form the group are determined based on the coding scheme used. This data stream, as used herein, will be known as the system stream and an exemplary system stream 20 is shown in FIG. 1.

Each system stream 20 includes a stream header 22 and a plurality of groups of frames 26, 28. The stream header 22 is encoded using a markup language such as XML. The stream header 22 is a markup language encoded document that describes at least one stream attribute associated with the data stream in which it is embedded. Each respective stream attribute described in the stream header 22 is denoted by a markup language tag that at least one of identifies data representing the respective attribute and provides instruction on processing the data representing the respective attribute. These stream attributes collectively define the stream syntax which is readable by a media player application and is needed to provide instructions to the media player application as to how to process the received stream data. For example, the stream header is able to provide information to initialize the correct decoders for decoding the received data stream. Without the proper instructions or if a data stream includes a header that is not readable by the media application, the media player application will fail and the data stream will not be decoded. Therefore, the media player application must be provided with a set of instructions regarding how each markup language tag will be handled.

Using markup language to encode stream attribute data is advantageous. Markup languages are easily expandable to incorporate new features and functions with respect to the data which it denotes. Any desired stream attribute can be encoded within the stream header 22. This aids in future expansion and deployment of data stream formats. Additionally, a system stream that provides stream syntax in XML will allow any media player application to receive and decode the information denoted by known tags and ignore the information denoted by unknown tags. Thus, the media player application will not fail when attempting to decode a stream that has unknown instructional information associated therewith. Stream attributes include but are not limited to height, width, bit rate, frame rate, stream size and stream duration.

The data stream shown in FIG. 1 includes two frame groups, a first frame group 26 and a second frame group 28. Each respective frame group 26, 28 includes a plurality of individual frames. The first frame group 26 includes three frames 26A, 26B, 26C and the second frame group 28 includes two frames 28A, 28B. The stream shown herein is for purposes of example only and the data stream 20 can include any number of frame groups formed from any number of individual frames as determined by the coding scheme used to encode the data stream 20. Each respective frame group has at least one frame group attribute associated therewith. The system stream 20 provides for a plurality of segment headers 24, each segment header 24 being positioned immediately preceding the first individual frame of a respective frame group. Similarly to the stream header 22, the segment header 24 is a markup language encoded document that includes information corresponding to the at least one stream attribute. Frame group attributes include but are not limited to type of frame group, i.e. group of key (I) frames or group of delta (P) frames, group length and group sequence number.

The stream header 22 and the segment headers 24 denote attribute information. These headers 22, 24 are not equivalent to individual packet or datagram headers which include information regarding the framing and sequencing of the respective packet or datagram. In contrast, the stream header 22 and packet header 24 are embedded within the data stream 20 separate from the packets or datagrams and provide information to a media player application instructing the application how to process and use the data stream.

Attributes of each of the data stream and the frame group are passed through an application interface along with the frame data. The XML encoder analyzes the attributes and detects changes in these attributes. Upon detecting the change in the attributes, the encoder encodes either a stream header 22 or a segment header 24 and inserts respective markup language tag when the pertinent change is detected. Some attributes of the stream are indirectly specified by the operator. For instance if the operator specifies that the video is to be encoded at 320×240 pixels these parameters will be encoded into the stream header. Any upgrade to the stream syntax will appear as a new tag within the header.

Figure 2:
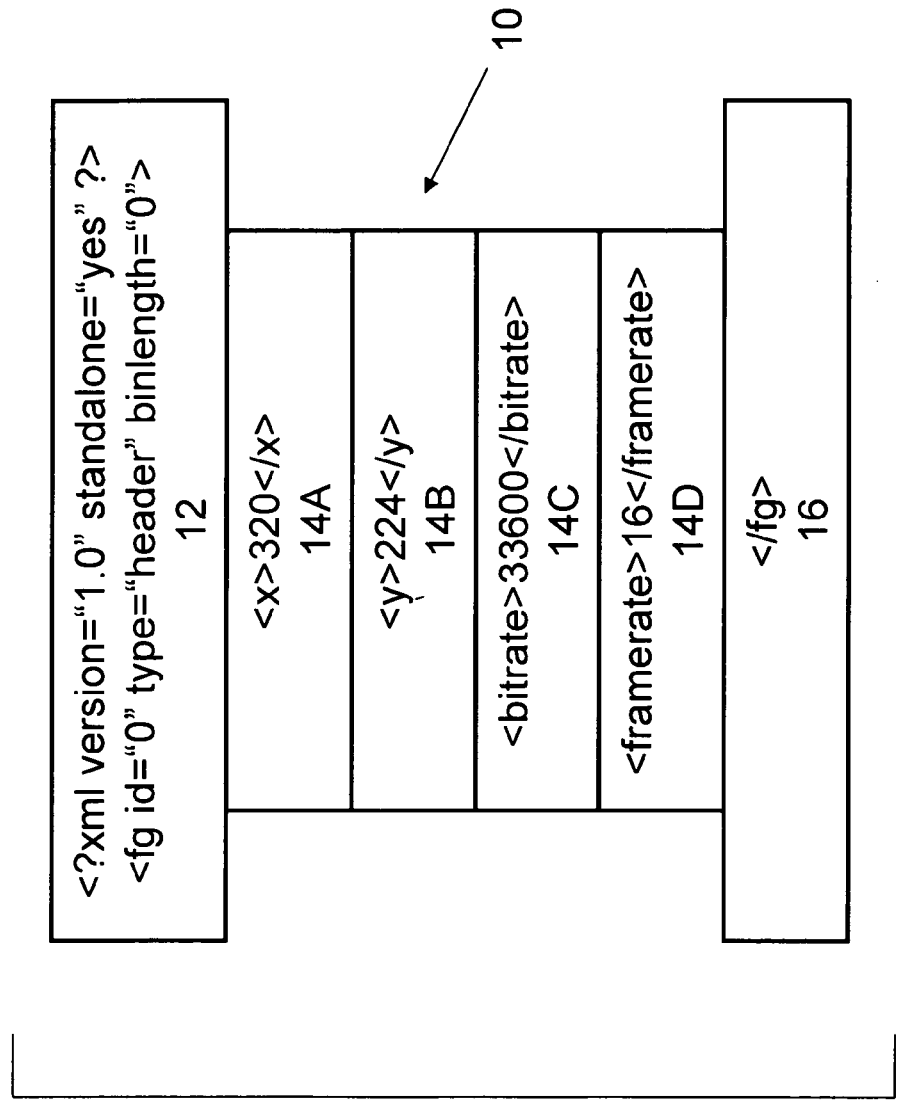
FIG. 2 is a block diagram of a header encoded according to invention principles.

FIG. 2 is an exemplary stream header 22. The format for each of the stream header 22 and the segment header 24 is the same and is directly dependent upon the number of attributes to be described within the respective header 22, 24 for describing either the data stream or group of frames associated therewith. The stream header 22 includes an opening field 12 including markup language tags that identify the document being encoded as the header. The stream header 22 further includes a plurality of attribute fields 14 each having information corresponding an attribute describing the data stream in which the header embedded. A first attribute field 14A includes a first markup language tag denoting data representing a first attribute. In the illustrated embodiment, this is the width x. Each of the second attribute field 14B, third attribute field 14C and fourth attribute field 14D include markup language tags denoting data representing additional attributes, e.g. height, bitrate and framerate, of the data stream 20 as shown in FIG. 1. The stream header 22 includes a close field 16 which includes a markup language tag denoting that the header 22 is closed and no additional information is present.

Figure 3:
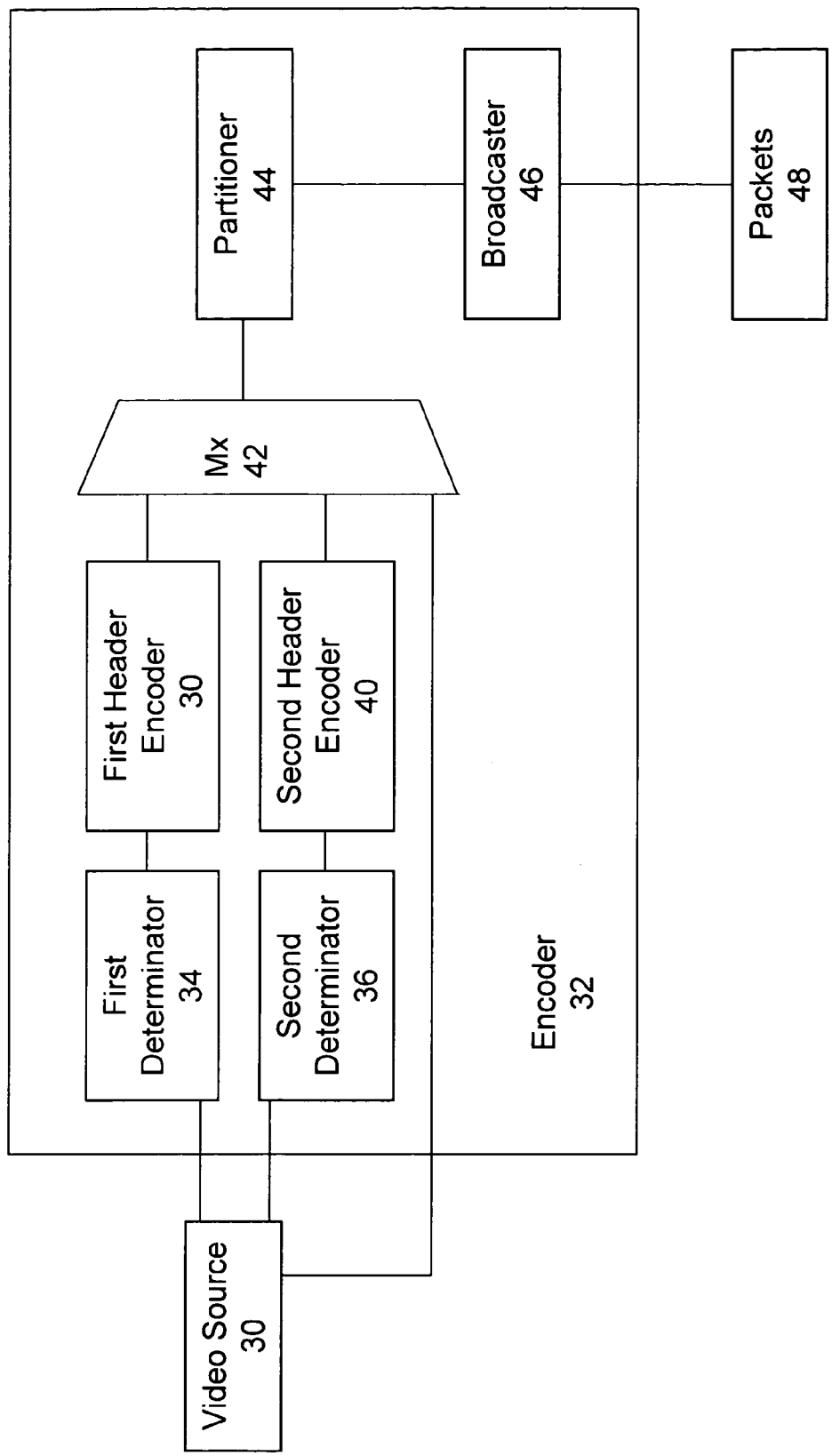
FIG. 3 is block diagram of an data stream encoder according to invention principles.

FIG. 3 is a block diagram of the encoder of the system. A source of video data 30, encoded using a predetermined coding scheme is provided. The encoded video data is provided to each of a first determinator 34, a second determinator 36 and a multiplexer 42. The first determinator 34 examines the encoded data stream and determines attributes associated with the video data stream and provides the determined attributes to a first header encoder 38. The first header encoder 38 encodes a stream header setting forth the stream syntax in response to the determined stream attributes using a markup language. The second determinator 36 analyzes the groups of frames that form the data stream and determines attributes associated with each respective frame group within the data stream. The determined frame group attributes are provided to a second header encoder 40 for encoding a frame group header setting forth the frame group syntax in response to the determined frame group attributes using a markup language. The first header encoder 38 and the second header encoder 40 provide the encoded stream and frame group headers to the multiplexer 42 which combines the headers with the video data stream. The multiplexed video data stream is provided to a partitioner 44 for partitioning of the data stream into transportable packets. The transportable packets are provided to a broadcaster 46 for broadcasting packets 48 thereof.

Figure 4:
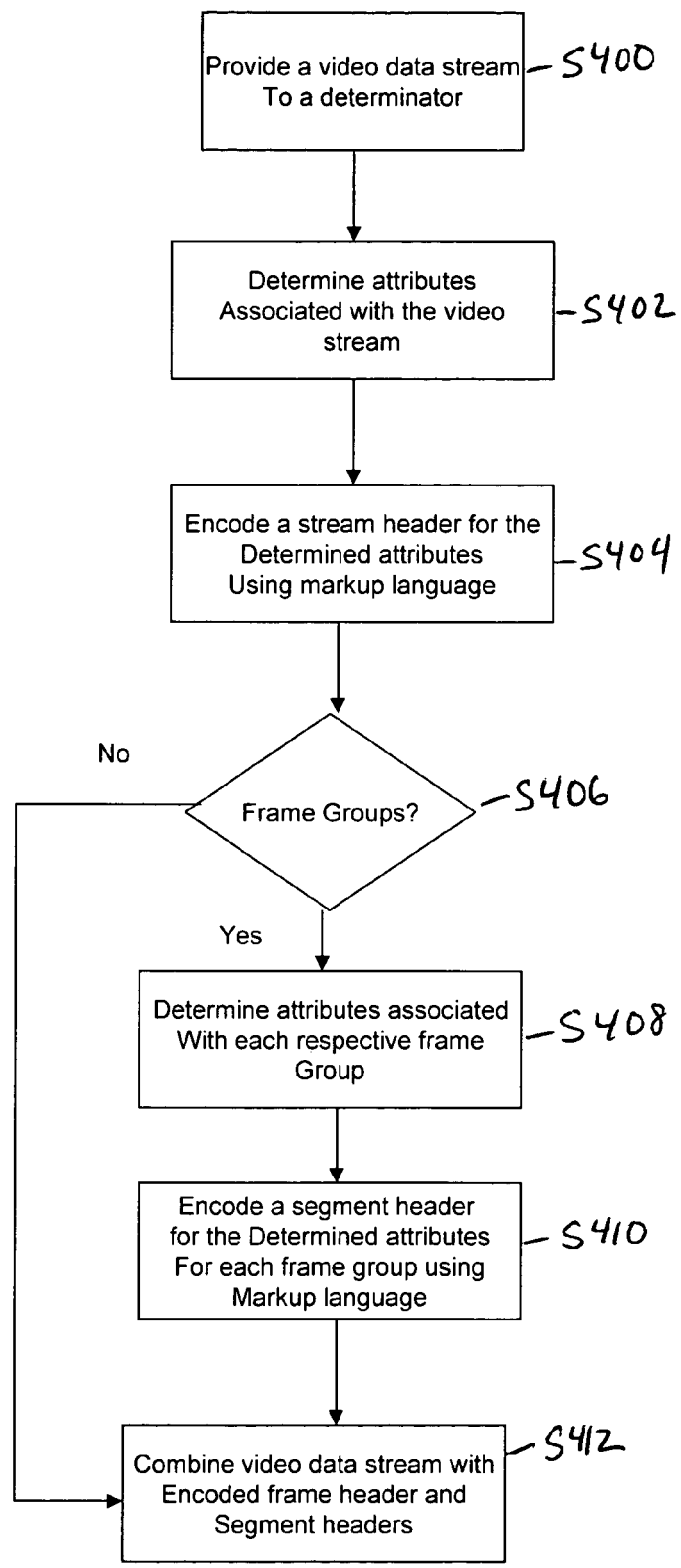
FIG. 4 is a flow diagram detailing the operation of the encoder of the present invention.

FIG. 4 is a flowchart detailing the encoding operation performed by the system In step S400, a video data stream is provided to a determinator. At the determinator, attributes representing the provided data stream are determined as in step S402. An encoder encodes a stream header in response to the determined stream attributes in step S404. Step S404 is performed using a markup language such as XML. The stream header encoded in step S404 includes a plurality of attribute fields, the number of which is directly related to the number of determined stream attributes from step S402. A further determination is made from the video data stream regarding the existence of frame groups within the data stream in step S406. If not, then the method proceeds to step S412 which will be discussed below. If there are frame groups within the frame, then a second determinator determines attributes associated with each respective frame group within the stream in step S408. In response to the determination in step S408, a segment header for each respective group of frames is encoded in step S410. Similar to the stream header, the segment header is encoded using a markup language, such as XML, and includes a includes a plurality of attribute fields, the number of which is directly related to the number of determined frame group attributes from step S408. In step S412, the video data stream is combined with each of the stream header and the respective segment headers to be processed and transmitted for receipt by a media player application such as will be discussed in FIGS. 5 and 6. During the combination step S412, the stream header is inserted prior to any of the respective frame groups and each segment header is inserted immediately prior to the respective group of frame associated therewith.

Figure 5:
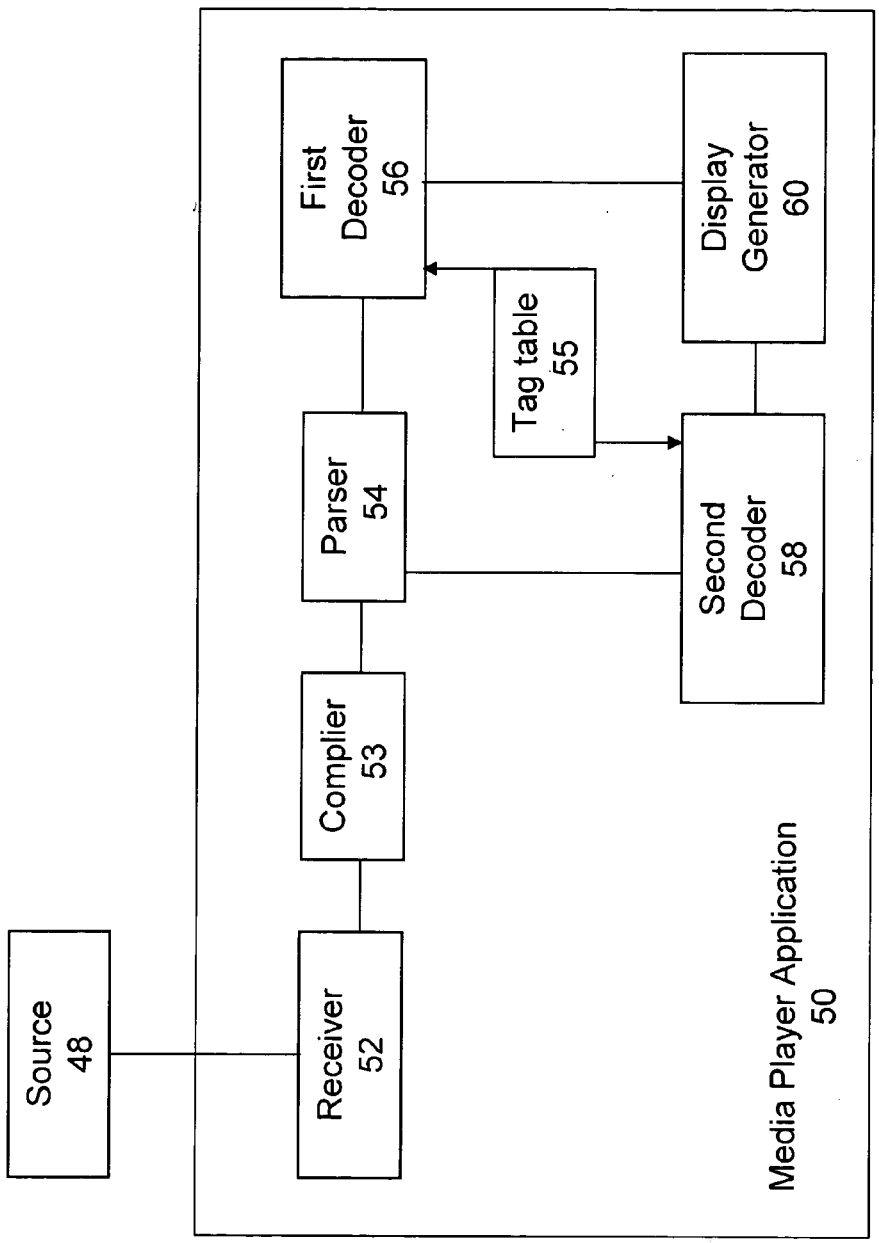
FIG. 5 is block diagram of a media player application according to invention principles.

FIG. 5 is a block diagram of a media player application 50 for receiving a plurality of packets from a source 48. The media player application 50 includes a receiver 52, a compiler, a parser 54, a first decoder 56, a second decoder 58, a tag table 55 and a display generator 60. The receiver 52 receives packets from the source of packets 48 which are broadcast by the broadcaster shown in FIG. 3. The compiler 53 complies the received packets to form a data stream including the plurality of frames. The transport layer treats the stream header and each respective segment header as a separate frame prior to decoding. The parser 54 parses the received data stream and analyzes at least one of the stream header and the segment header. This analysis determines the existence of markup tags identifying respective stream attributes and frame group attributes. The value of each tag is stored in the tag table 55. The values in the tag table 55 are presented to each of the decoders 56, 58. The decoders 56, 58 review tags within the headers and look at entries in the tag table 55 to determine if the tag contains instructions to initiate a function performed by the decoders 56, 58. Upon determining the attributes associated with at least one of the data stream or a respective frame group within the stream, any of the first decoder 58 and second decoder 56 are initiated for decoding the received data stream. The decoded stream is provided to the display generator 60 for generating a display outputting the data stream via the media player application. The display generator 60 may also be in communication with the parser 54 and operate in response to a data associated with a respective markup tag within the stream header or segment header.

Figure 6:
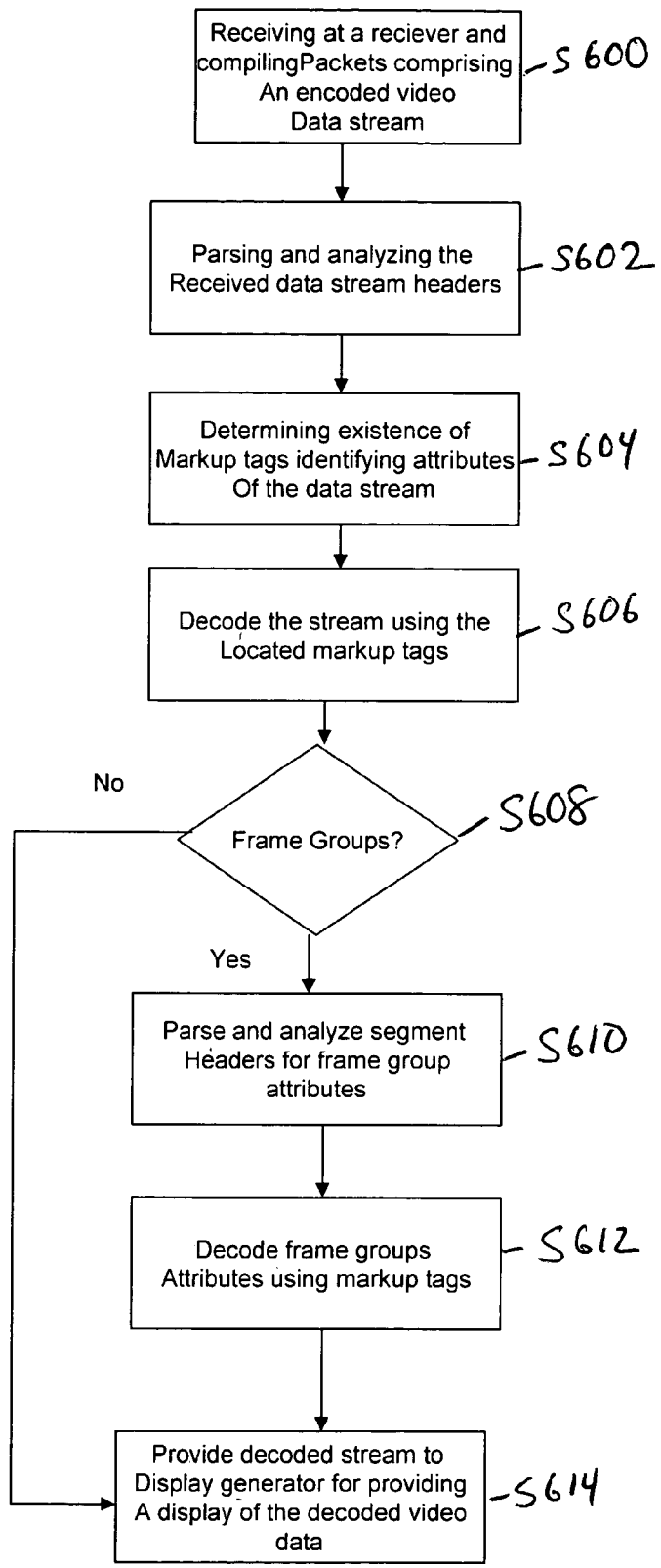
FIG. 6 is a flow diagram detailing the operation of the media player application according to invention principles.

FIG. 6 is a flow diagram detailing the operation of the media player application shown in FIG. 5. The media player application receives, via a receiver, a plurality of packets that form an encoded data stream in step S600. In step S602, the data stream is parsed and the each of the stream header and the respective segment headers are analyzed. In step S604, the parser determines the existence of any markup tags that identify attributes of the entire data stream and provides instructions to any respective components regarding how the data stream is to be decoded. The data stream is decoded in response to the markup tags found in step S606. A determination is made in step S608 whether or not the data stream includes any frame groups. If not, then the process continues at step S614 discussed below. If the data stream includes frame groups, then the parser analyzes the segment headers for any markup tags representing frame group attributes associated with the respect frame group in step S610. In step 612, instructions from the segment headers are provided to components for decoding the frame groups of the data stream using the markup tags located in step S610. In response to the decoding of the stream and the respective frame groups, the decoded stream is provided to a display generator for generating a display of the decoded stream using the media player application in step S614.

Upgrades to stream version formats are transparent and easily accomplished because there need not be any major deployment of new stream decoding parameters to a plurality of media player applications. The markup language allows the existing media players to decode new stream versions because the media player applications will just analyze and make use of the markup language tags with which it familiar. Thus, additional types of data such as annotations, synchronized media event data or any other attribute may be selectively added to the stream syntax without disabling previously deployed components.

What is claimed:

1. A system for encoding a video data stream, said system comprising:
   a first determinator for determining attributes associated with the video data stream;
   an encoder for receiving the attributes from the first determinator and encoding a stream header identifying stream syntax, said stream header being encoded in a markup language; and
   a multiplexer for combining the encoded stream headers with the video data stream.

2. The system of claim 1, further comprising a second determinator for determining attributes associated with frame groups within the data stream.

3. A system for encoding a video data stream, said system comprising:
   a first determinator for determining attributes associated with the video data stream;
   a second determinator for determining attributes associated with frame groups within the data stream;
   an encoder for receiving the attributes from the first and second determinators and encoding a stream header identifying stream syntax, said stream header being encoded in a markup language, wherein said encoder encodes a segment header including the determined attributes identifying a frame group syntax for each frame group of the data stream in a markup language; and
   a multiplexer for combining the encoded stream headers with the video data stream.

4. The system of claim 3, wherein the markup language is XML.

5. The system of claim 3, wherein the multiplexer positions the encoded stream header prior to a payload of the data stream, wherein the payload comprises all the groups of frames.

6. The system of claim 5, wherein the multiplexer positions each encoded segment header within the data stream prior to its respective frame group.

7. A system for encoding a video data stream, said system comprising:
   a first determinator for determining attributes associated with the video data stream;
   an encoder for receiving the attributes from the first determinator and encoding a stream header identifying stream syntax, said stream header being encoded in a markup language;
   a multiplexer for combining the encoded stream headers with the video data stream; and
   a partitioner for partitioning the data stream into transportable packets.

8. A system for encoding a video data stream, said system comprising:
- a first determinator for determining attributes associated with the video data stream;
- an encoder for receiving the attributes from the first determinator and encoding a stream header identifying stream syntax, said stream header being encoded in a markup language; and
- a multiplexer for combining the encoded stream headers with the video data stream; wherein
- the stream header includes a plurality of fields, each field defining a respective one of said determined stream attributes.

9. The system of claim 3, wherein the segment headers each include a plurality of fields, each field defining a respective one of said determined frame group attributes.

10. A method of encoding a video data stream, said method comprising the activities of:
- determining attributes associated with the video data stream;
- encoding a stream header identifying stream syntax based upon the determined stream attributes, the stream header being encoded in a markup language; and
- combining the encoded stream header with the video data stream.

11. The method of claim 10, wherein the markup language is XML.

12. A method of encoding a video data stream, said method comprising the activities of:
- determining attributes associated with the video data stream;
- encoding a stream header identifying stream syntax based upon the determined stream attributes, the stream header being encoded in a markup language;
- determining attributes associated with each frame group within the data stream;
- encoding a segment header for each respective frame group, each segment header defining frame group syntax of the respective frame group; and
- combining the encoded stream header and segment header with the video data stream.

* * * * *